(No Model.) 2 Sheets—Sheet 1.
G. W. JENNINGS.
LAWN MOWER.
No. 507,543. Patented Oct. 31, 1893.
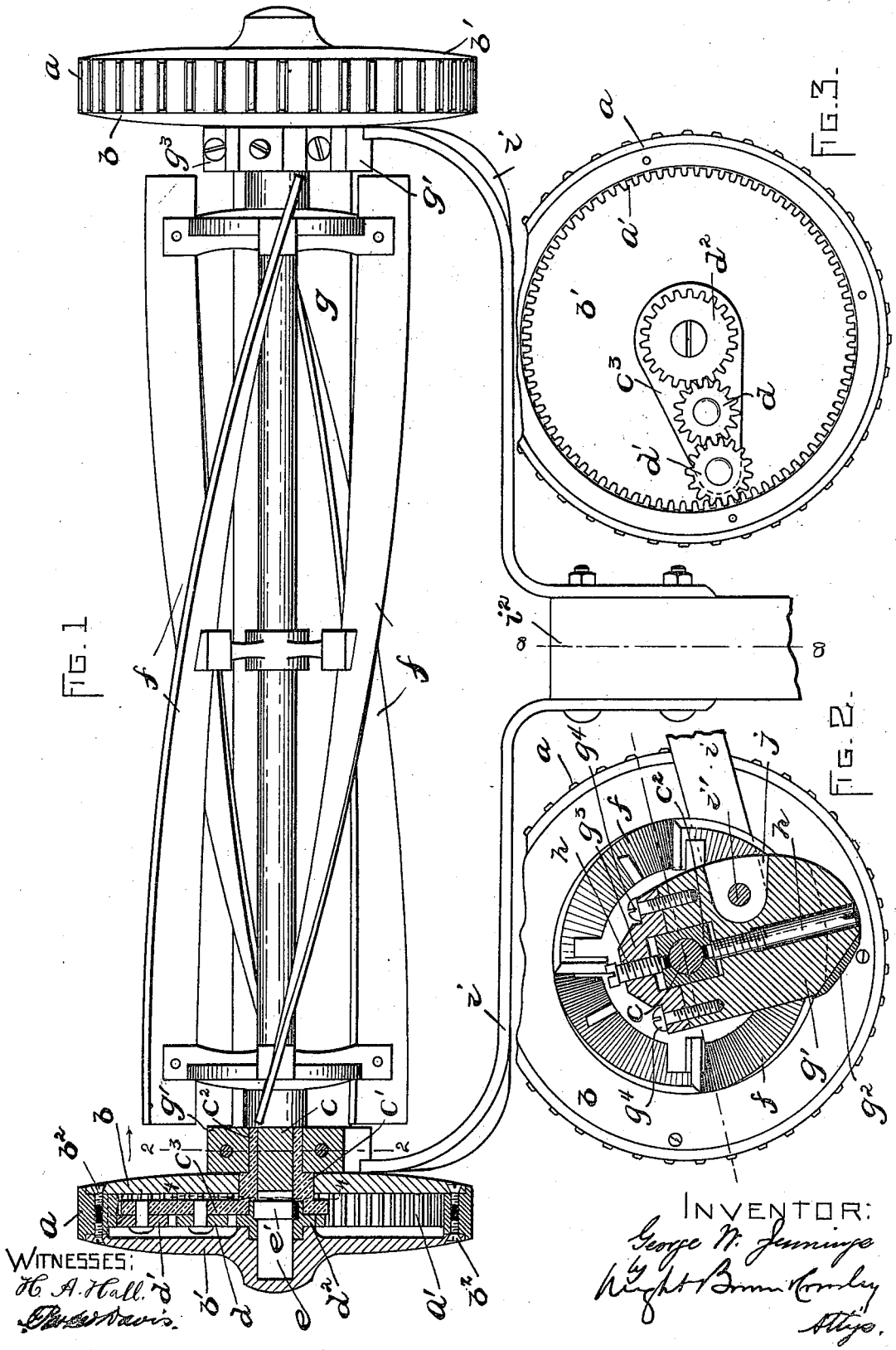

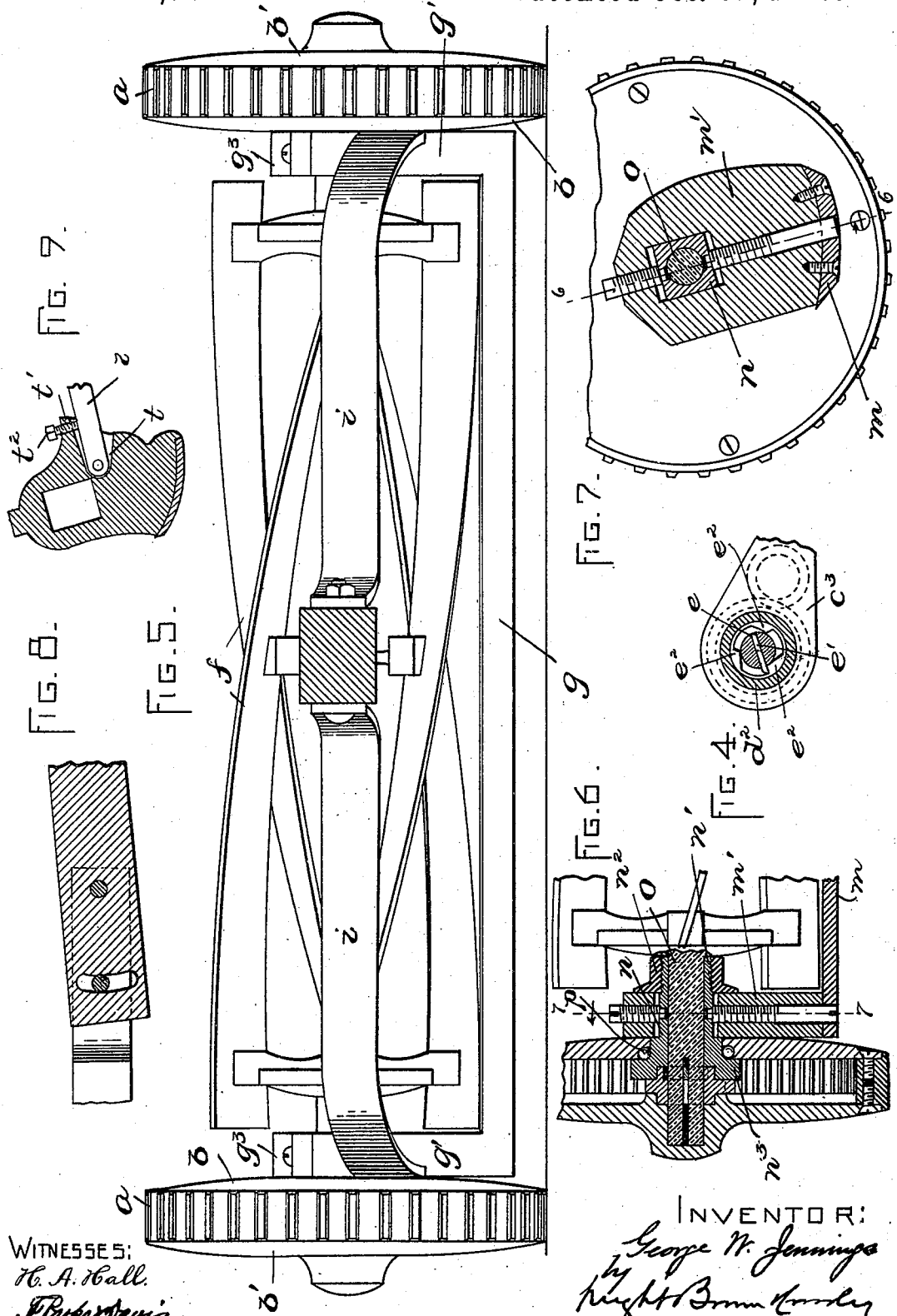

UNITED STATES PATENT OFFICE.

GEORGE W. JENNINGS, OF NEWTON, MASSACHUSETTS, ASSIGNOR TO GEORGE W. POPE, JR., OF SAME PLACE.

LAWN-MOWER.

SPECIFICATION forming part of Letters Patent No. 507,543, dated October 31, 1893.

Application filed March 23, 1893. Serial No. 467,288. (No model.)

*To all whom it may concern:*

Be it known that I, GEORGE W. JENNINGS, of Newton, in the county of Middlesex and State of Massachusetts, have invented certain new and useful Improvements in Lawn-Mowers, of which the following is a specification.

This invention relates to certain improvements in lawn mowers, the objects being to simplify and cheapen the construction, to provide for adjustability of the wipers with respect to the cutting knife, to inclose the driving parts within the ground-wheels, and to render the action of the cutting blade more effective and allow it to yield upon encountering a clump of grass or other obstruction, whereby the parts are relieved of undue strain.

With these ends in view, the invention consists in certain novel features of construction and arrangements of parts which will be described and claimed hereinafter.

Constructions by which the invention may be carried out are illustrated in the accompanying drawings, in which—

Figure 1 shows the top view of the machine, with one end in section. Fig. 2 shows a section on line 2, 2 of Fig. 1, and looking in the direction of the arrow. Fig. 3 shows one of the ground wheels with the outer side removed. Fig. 4 shows a section at the center of one of the ground wheels, taken on line 4, 4 of Fig. 1. Fig. 5 shows a back view of the machine. Fig. 6 shows a sectional view of one end of the machine, illustrating a modified construction. Fig. 7 shows a section on line 7, 7 of Fig. 6. Fig. 8 shows a detail of part of the handle. Fig. 9 shows a detail of a modified form of supporting ear for the cutting blade.

The same letters of reference indicate the same parts in all of the figures.

Each of the ground wheels is composed of an annular central member $a$, around the interior of which are formed gear-teeth $a'$ and the sides $b$ and $b'$, which are secured to the annular central member by screws $b^2$. The wiper-shaft $c$ fits through the inner side $b$, and its end finds a bearing in the outer side $b'$. A sleeve is fitted on said shaft, and has a round part $c'$, which the wheel-side $b$ engages; and a square part $c^2$, forming a journal-box by which the shaft is adjusted, as hereinafter explained. An arm $c^3$ is formed on the said sleeve and inclosed within the wheel. This arm carries gears $d\ d'$, connecting the interior teeth of the ground-wheel with a gear $d^2$ loose on the wiper-shaft.

The construction by which motion is imparted to the wiper-shaft only when the ground-wheels are turning in one direction, is as follows: The wiper-shaft is bifurcated at the end by a slot $e$, and receives a double-ended pawl or dog $e'$; and the gear $d^2$ has interior lugs $e^2$, one side of each one of which is beveled and the other side straight or radial. When the gear is revolved in one direction by the ground-wheel, the straight or radial side of one of the lugs $e^2$ bears against the pawl or lug $e'$, and thereby rotates the wiper-shaft and the wiper-blades $f$ carried thereby. When the gear is turned in the opposite direction, the inclined or beveled sides of the lugs engage the bevels on the dog or pawl and move it back and forth, whereby no motion is imparted to the wiper-shaft. There are three of the lugs $e^2$, arranged equidistant, so that, when one lug encounters the dog or pawl, the latter may be projected between the other two (see Fig. 4).

In the construction shown in Figs. 2 and 5, a bed-plate $g$ is formed integral with side ears or supports $g'$, and the cutter-blade $g^2$ is fastened on said bed-plate. Each of the said ears is formed to engage the square part $c^2$ of one of the sleeves on the wiper-shaft, and is confined thereon by means of a cap $g^3$, fitting over the said square part $c^2$ of the sleeve and secured by screws $g^4$ to the ear. The opening in the ear which receives the square box is of greater extent than the latter, whereby an adjustment of the box in said opening may be effected. Adjusting screws $h$ extend through the ear and the cap, and engage depressions in the upper and lower sides of the square box. It will be seen that, by turning these screws, the wipers may be adjusted to a nicety with respect to the cutting blade. Said screws also serve to hold the wheel on the shaft.

The handle $i^2$ has branches $i$, which are connected with the supporting ears $g'$ at points $i'$ below the center of the wiper-shaft. By this construction the power applied to the handle to propel the mower forward tends to hold the cutting-blade in its forward position, and thus increase the efficiency of the machine. The branches of the handle are pivotally connected with the supporting ears $g'$, and the depressions $j$ in which the handle branches fit are enlarged to permit a slight independent movement between the handle and the supporting ears whereby, upon the cutting-blade encountering a clump of grass or other obstruction, it may yield to the same, thus relieving the parts of strain, and this independent movement of the ears throws the wheels over a protuberance on the surface over which the machine travels. One side of the depression $j$ forms a stop to limit this independent movement.

The formation of the ground wheels in three sections facilitates the manufacture, as the gear teeth on the interior of the annular member may be more readily cleaned out, the cutting implement being permitted to pass through and through.

It will be observed that the driving parts are all inclosed within the ground wheels, and are thus protected and prevented from becoming inoperative by the teeth being clogged with grass or other matter.

In the construction shown in Figs. 6 and 7, a bed plate, as $g$ in the former construction, is dispensed with, and a cutting blade $m$ is fastened to arms $m'$, and these arms are each cast in one piece, with a square opening to receive the square part of a sleeve $n$, which is on the wiper shaft $o$. This is a simpler and cheaper construction than that before described, in which the supporting arms were each in two pieces. The sleeve $n$ has a screw threaded portion $n'$, projecting from the arm $m'$ and receiving a nut $n^2$, which is screwed up against said arm and serves to hold the ground wheel on the shaft. The inner side of the ground wheel, which turns on a round portion of the sleeve $n$, is provided with a channel, containing anti-friction balls $p$, whereby a ball bearing is obtained between the sleeve and wheel, the sleeve having a flange $n^3$ to confine said balls.

The construction of the ground wheel, the gearing, and the construction for adjusting the cutting blade with respect to the wiper blades, are as before described.

The wiper shaft may not extend entirely across the machine, as shown in Fig. 1, but may consist of trunnions, fastened in the heads which carry the wiper blades.

The handle $i^2$ is adjustable to different angular positions. It is pivotally connected by a bolt $r$ with the branches $i$, and has a slot $r'$ which receives another bolt $r^2$ fastened in the branches $i$. It will be seen that by loosening the bolt $r^2$ the handle may be turned to different angles on the pivot bolt $r$, and locked again by tightening the bolt $r^2$.

The cutting blade $m$ has a curve approximating the circle described by the wipers in their rotation. Hence when the blade is ground down to sharpen it only, a very slight adjustment is necessary to bring it in proper relation to the wipers.

Referring to Fig. 9, the ears may each be constructed with a flaring recess $t$ and a lug $t'$ above the same, and provided with a set-screw $t^2$ to bear against the handle. By this construction the angular position of the ear may be adjusted.

It is evident the construction here shown may be varied in numerous ways without departing from the spirit and scope of the invention, and therefore it is to be understood that I am not confined to such construction.

Having thus described my invention, what I claim as new, and desire to secure by Letters Patent, is—

1. A lawn-mower, comprising in its construction a wiper-shaft, journal-boxes thereon, and ears engaging said journal-boxes and adjustable thereon, said ears carrying the cutting-blade.

2. A lawn-mower, comprising in its construction a wiper-shaft, a sleeve on said shaft and having a square portion and an arm, an ear fitting adjustably on the square part of said sleeve and forming a support for the cutting-blade, a ground-wheel mounted on the sleeve and inclosing the arm thereof, and gearing connecting the ground-wheel and wiper-shaft.

3. A lawn-mower, comprising in its construction a wiper-shaft, a sleeve on said shaft and having a square portion, an ear fitting on the square portion of the sleeve and constituting a support for the cutting-blade, adjusting-screws in the ear and engaging the sleeve, and a ground-wheel mounted on the sleeve.

4. A lawn-mower, comprising in its construction a wiper-shaft, a sleeve on said shaft and having a square portion and a screw-threaded portion, an ear engaging the square portion of the sleeve and constituting a support for the cutting-blade, a nut on the threaded portion of the sleeve, and a ground-wheel mounted on the sleeve.

5. A lawn-mower, comprising in its construction a wiper-shaft, a sleeve thereon having a flange, a ground-wheel mounted on the sleeve and having a channel at the bearing, and anti-friction balls in said channel and confined by the flange of the sleeve.

6. In a lawn-mower, arms supporting the cutting-blade and connected with the wiper-shaft, which is the axis of the ground wheels, and a handle connected with said supporting-arms below the center of the wiper-shaft, the arms having stops which permit a limited independent movement on the handle.

In testimony whereof I have signed my name to this specification, in the presence of two subscribing witnesses, this 20th day of March, A. D. 1893.

GEORGE W. JENNINGS.

Witnesses:
A. D. HARRISON,
F. PARKER DAVIS.